US010126521B2

(12) United States Patent
Ogino et al.

(10) Patent No.: US 10,126,521 B2
(45) Date of Patent: Nov. 13, 2018

(54) LEAF SPRING, CAMERA MODULE DRIVE MECHANISM, ELECTRONIC TERMINAL, AND METHOD FOR PRODUCING LEAF SPRING

(71) Applicant: DAI NIPPON PRINTING CO., LTD., Tokyo-to (JP)

(72) Inventors: Yoshihiko Ogino, Tokyo-to (JP); Chikao Ikenaga, Tokyo-to (JP); Takahiro Sahara, Tokyo-to (JP); Masahiro Nagata, Tokyo-to (JP)

(73) Assignees: DAI NIPPON PRINTING CO., LTD., Tokyo (JP); ALPS ELECTRIC CO., LTD., Tokyo (JP)

(*) Notice: Subject to any disclaimer, the term of this patent is extended or adjusted under 35 U.S.C. 154(b) by 0 days.

(21) Appl. No.: 14/786,789

(22) PCT Filed: Apr. 23, 2014

(86) PCT No.: PCT/JP2014/061392
§ 371 (c)(1),
(2) Date: Oct. 23, 2015

(87) PCT Pub. No.: WO2014/175318
PCT Pub. Date: Oct. 30, 2014

(65) Prior Publication Data

US 2016/0077303 A1 Mar. 17, 2016

(30) Foreign Application Priority Data

Apr. 23, 2013 (JP) ................................ 2013-090665
Apr. 23, 2013 (JP) ................................ 2013-090725

(51) Int. Cl.
*G02B 7/02* (2006.01)
*G02B 7/04* (2006.01)
(Continued)

(52) U.S. Cl.
CPC ................ *G02B 7/04* (2013.01); *F16F 1/021* (2013.01); *F16F 1/18* (2013.01); *G02B 7/026* (2013.01);
(Continued)

(58) Field of Classification Search
CPC .......... G02B 7/023; G02B 7/04; G03B 17/02; G03B 3/02; F16F 1/18; F16F 1/368; G11B 23/08721; G11B 23/08728; B60J 3/0265
(Continued)

(56) References Cited

U.S. PATENT DOCUMENTS 4,692,192 A * 9/1987 Ikushima ................. C22C 9/06 148/414
2008/0117536 A1 5/2008 Higuchi
(Continued)

FOREIGN PATENT DOCUMENTS

JP H04-121028 U 10/1992
JP H09-093901 A 4/1997
(Continued)

OTHER PUBLICATIONS

T. D. Schlabach, Copper Alloy Spring Materials and Spring Properties, IEEE Transcations on Parts, Hybrids, And Packaging, vol. PHP-9, No. 4, Dec. 1973.*
(Continued)

*Primary Examiner* — William Choi
*Assistant Examiner* — Vipin Patel
(74) *Attorney, Agent, or Firm* — Oliff PLC

(57) ABSTRACT

There is provided a leaf spring which can prevent a reduction in the spring strength and can also prevent a reduction in the electrical conductivity when the thickness of the leaf spring is decreased. The leaf spring includes an outer frame portion an inner frame portion 5*b*, 11*b* disposed inside the
(Continued)

outer frame portion 5*a*, 11*a*, and spring portions provided between the inner frame portion and the outer frame portion The leaf spring is made of a Cu-based alloy, and has an electrical conductivity of not less than 8% IACS and a 0.2% proof stress of not less than 900 MPa.

17 Claims, 9 Drawing Sheets

(51) Int. Cl.

| | |
|---|---|
| ***G02B 7/08*** | (2006.01) |
| ***F16F 1/02*** | (2006.01) |
| ***F16F 1/18*** | (2006.01) |
| ***G03B 13/32*** | (2006.01) |
| ***G03B 3/10*** | (2006.01) |
| ***G03B 5/00*** | (2006.01) |

(52) U.S. Cl.
CPC ................ *G02B 7/08* (2013.01); *G03B 3/10* (2013.01); *G03B 5/00* (2013.01); *G03B 13/32* (2013.01); *F16F 2224/0208* (2013.01); *G03B 2205/0046* (2013.01); *G03B 2205/0053* (2013.01)

(58) Field of Classification Search
USPC ........ 359/824; 267/36.1, 40–45, 361, 25–32, 267/140.11–140.15
See application file for complete search history.

(56) References Cited

U.S. PATENT DOCUMENTS

2009/0295986 A1* 12/2009 Topliss .................... F03G 7/065 348/374
2011/0205646 A1* 8/2011 Sato ........................ F16F 1/027 359/824

FOREIGN PATENT DOCUMENTS

| | | | |
|---|---|---|---|
| JP | 2005-258355 | A | 9/2005 |
| JP | 2009-020169 | A | 1/2009 |
| JP | 2009-025107 | A | 2/2009 |
| JP | 2009-122360 | A | 6/2009 |
| JP | 2009-210055 | A | 9/2009 |
| JP | 2011-169443 | A | 9/2011 |
| JP | 2012-177197 | A | 9/2012 |
| WO | 2012/026611 | A1 | 3/2012 |

OTHER PUBLICATIONS

Mar. 3, 2017 Office Action issued in Taiwanese Patent Application No. 103114680.
Oct. 27, 2015 International Preliminary Report on Patentability issued in International Patent Application No. PCT/JP2014/061392.
Sep. 27, 2013 Office Action issued in Japanese Patent Application No. 2013-007417.
Aug. 5, 2014 Search Report issued in International Patent Application No. PCT/JP2014/061392.
Jan. 9, 2018 Office Action issued in Japanese Patent Application No. 2015-513790.

* cited by examiner

LEAF SPRING, CAMERA MODULE DRIVE MECHANISM, ELECTRONIC TERMINAL, AND METHOD FOR PRODUCING LEAF SPRING

CROSS-REFERENCE TO RELATED APPLICATIONS

This application claims priority to Japanese Patent Application No. 2013-7417, filed on Jan. 18, 2013, Japanese Patent Application No. 2013-90665, filed on Apr. 23, 2013, and Japanese Patent Application No. 2013-90725, filed on Apr. 23, 2013, the disclosures of which are incorporated herein by reference in their entirety.

TECHNICAL FIELD

The present invention relates to a leaf spring for use in a camera module drive mechanism, a camera module drive mechanism, an electronic terminal, and a method for producing a leaf spring.

BACKGROUND ART

A camera module drive mechanism (voice coil motor (VCM)), which can displace a lens unit in the direction of the optical axis by an interaction between an electric current flowing in a coil and a magnetic field of a magnetic circuit composed of a yoke and a magnet e.g. for the purpose of autofocusing or zooming, is used in a compact electronic device with a camera, such as a cellular phone, a smartphone, a tablet terminal or a notebook PC.

A leaf spring for supporting a holder, holding the lens unit, in such a manner as to be capable of displacing the holder in the direction of the optical axis of the lens unit, is used in the camera module drive mechanism.

PRIOR ART DOCUMENT

Patent Document

Patent document 1: Japanese Patent Laid-Open Publication No. 2009-210055

SUMMARY OF THE INVENTION

Problems to be Solved by the Invention

As compact electronic devices are becoming thinner these days, there is a demand to make camera modules thinner. There is, therefore, a demand to make a leaf spring, which is to be incorporated in a camera module, as thin as possible. On the other hand, the spring strength necessary for a leaf spring varies depending on the weight of a camera lens. In particular, when using a heavy lens, it is necessary to use a leaf spring having an increased thickness so as to increase the spring strength. In contrast, when using a light lens, it is necessary to use a leaf spring having a decreased thickness. With such a background, a leaf spring is generally produced by etching, using a thin copper-alloy high-strength material having a thickness of about 20 μm to 100 μm.

A leaf spring is electrically connected to a coil; an electric current is allowed to flow from the leaf spring to the coil when actuating a camera module drive mechanism. However, when the leaf spring has a decreased thickness, the electrical conductivity is reduced. Therefore, in some cases, it is not possible to supply a sufficient amount of electric current from the leaf spring to the coil, leading to a failure to securely actuate the camera module drive mechanism. Furthermore, a decrease in the thickness of a leaf spring may significantly reduce the spring strength of the leaf spring.

The present invention has been made in view of the above situation. It is therefore an object of the present invention to provide a leaf spring, a camera module drive mechanism, an electronic terminal, and a method for producing a leaf spring which, even when the leaf spring has a decreased thickness, do not involve a significant reduction in the electrical conductivity of the leaf spring and can decrease the reduction in the spring strength.

Means for Solving the Problems

The present invention provides a leaf spring for use in a camera module drive mechanism and which is produced by using a copper alloy leaf-spring material, comprising: an outer frame portion; an inner frame portion disposed inside the outer frame portion; and a spring portion provided between the inner frame portion and the outer frame portion, wherein the leaf-spring material has a stress at 0.2% strain of not less than 1150 MPa and a stress at 0.025% strain of not less than 1000 MPa.

In an embodiment of the leaf spring of the present invention, the leaf-spring material comprises beryllium-copper, nickel-tin-copper or titanium-copper.

The present invention also provides a camera module comprising: a chassis; a lens unit that constitutes an optical system; a holder disposed in the chassis and housing the lens unit and which is movable in the direction of the optical axis of the lens unit; a coil provided on the holder; a yoke and a magnet piece, which are provided on the chassis and which provide a magnetic field to the coil; and a leaf spring interposed between the chassis and the holder, wherein the leaf spring is produced by using a copper alloy leaf-spring material, and the leaf spring includes: an outer frame portion; an inner frame portion disposed inside the outer frame portion; and a spring portion provided between the inner frame portion and the outer frame portion and which allows the outer frame portion and the inner frame portion to expand/contract in the normal direction of the leaf spring, and wherein the leaf-spring material has a stress at 0.2% strain of not less than 1150 MPa and a stress at 0.025% strain of not less than 1000 MPa.

In an embodiment of the camera module of the present invention, the leaf-spring material comprises beryllium-copper, nickel-tin-copper or titanium-copper.

The present invention also provides an electronic terminal including a camera module.

The present invention also provides a method for producing a leaf spring for use in a camera module drive mechanism, comprising the steps of: preparing a copper alloy leaf-spring material having a stress at 0.2% strain of not less than 1150 MPa and a stress at 0.025% strain of not less than 1000 MPa; and processing the leaf-spring material into a predetermined planar shape, thereby forming the leaf spring.

In an embodiment of the leaf spring production method of the present invention, the step of preparing a copper alloy leaf-spring material includes the step of annealing a rolled leaf-spring material.

In an embodiment of the leaf spring production method of the present invention, the leaf-spring material comprises beryllium-copper, nickel-tin-copper or titanium-copper.

The present invention also provides a leaf spring for use in a camera module drive mechanism, comprising: an outer frame portion; an inner frame portion disposed inside the outer frame portion; and a spring portion provided between the inner frame portion and the outer frame portion, wherein the spring portion has a parallelogram cross-sectional shape including an upper side and a lower side which are parallel to each other, the other two sides being curved inward.

The present invention also provides a leaf spring for use in a camera module drive mechanism, comprising: an outer frame portion; an inner frame portion disposed inside the outer frame portion; and a spring portion provided between the inner frame portion and the outer frame portion, wherein the spring portion has a trapezoidal cross-sectional shape including an upper side and a lower side which are parallel to each other, the other two sides being curved inward.

In an embodiment of the present invention, the leaf spring is produced by using a copper alloy leaf-spring material, and the leaf-spring material has a stress at 0.2% strain of not less than 1150 MPa and a stress at 0.025% strain of not less than 1000 MPa.

The present invention also provides a camera module drive mechanism comprising: a chassis; a lens unit that constitutes an optical system; a holder disposed in the chassis and housing the lens unit and which is movable in the direction of the optical axis of the lens unit; a coil provided on the holder; a yoke and a magnet piece, which are provided on the chassis and which provide a magnetic field to the coil; and a leaf spring interposed between the chassis and the holder, wherein the leaf spring includes; an outer frame portion; an inner frame portion disposed inside the outer frame portion; and a spring portion provided between the inner frame portion and the outer frame portion, and wherein the spring portion has a parallelogram cross-sectional shape including an upper side and a lower side which are parallel to each other, the other two sides being curved inward.

The present invention also provides a camera module drive mechanism comprising: a chassis; a lens unit that constitutes an optical system; a holder disposed in the chassis and housing the lens unit and which is movable in the direction of the optical axis of the lens unit; a coil provided on the holder; a yoke and a magnet piece, which are provided on the chassis and which provide a magnetic field to the coil; and a leaf spring interposed between the chassis and the holder, wherein the leaf spring includes: an outer frame portion; an inner frame portion disposed inside the outer frame portion; and a spring portion provided between the inner frame portion and the outer frame portion, and wherein the spring portion has a trapezoidal cross-sectional shape including an upper side and a lower side which are parallel to each other, the other two sides being curved inward.

In an embodiment of the camera module drive mechanism of the present invention, the leaf spring is produced by using a copper alloy leaf-spring material, and the leaf-spring material has a stress at 0.2% strain of not less than 1150 MPa and a stress at 0.025% strain of not less than 1000 MPa.

The present invention also provides a leaf spring for use in a camera module drive mechanism and which is produced by using a copper alloy leaf-spring material, comprising: an outer frame portion; an inner frame portion disposed inside the outer frame portion; and a spring portion provided between the inner frame portion and the outer frame portion, wherein the leaf-spring material has an electrical conductivity of not less than 8% IACS and a 0.2% proof stress of not less than 900 MPa.

In an embodiment of the present invention, the leaf-spring material has a Vickers hardness of not less than 290 HV.

In an embodiment of the present invention, the leaf-spring material does not contain beryllium as a component thereof.

In an embodiment of the leaf-spring material of the present invention, the spring portion has a parallelogram cross-sectional shape including an upper side and a lower side which are parallel to each other, the other two sides being curved inward.

In an embodiment of the leaf-spring material of the present invention, the spring portion has a trapezoidal cross-sectional shape including an upper side and a lower side which are parallel to each other, the other two sides being curved inward.

The present invention also provides a camera module drive mechanism comprising: a chassis; a lens unit that constitutes an optical system; a holder disposed in the chassis and housing the lens unit and which is movable in the direction of the optical axis of the lens unit; a coil provided on the holder; a yoke and a magnet piece, which are provided on the chassis and which provide a magnetic field to the coil; and a leaf spring interposed between the chassis and the holder, wherein the leaf spring is produced by using a copper alloy leaf-spring material, and the leaf spring includes: an outer frame portion; an inner frame portion disposed inside the outer frame portion; and a spring portion provided between the inner frame portion and the outer frame portion, and wherein the leaf-spring material has an electrical conductivity of not less than 8% IACS and a 0.2% proof stress of not less than 900 MPa.

In an embodiment of the camera module drive mechanism of the present invention, the leaf-spring material has a Vickers hardness of not less than 290 HV.

In an embodiment of the camera module drive mechanism of the present invention, the leaf-spring material does not contain beryllium as a component thereof.

In an embodiment of the camera module drive mechanism of the present invention, the spring portion has a parallelogram cross-sectional shape including an upper side and a lower side which are parallel to each other, the other two sides being curved inward.

In an embodiment of the camera module drive mechanism of the present invention, the spring portion has a trapezoidal cross-sectional shape including an upper side and a lower side which are parallel to each other, the other two sides being curved inward.

Advantageous Effects of the Invention

According to the present invention, even when the leaf spring has a decreased thickness, the reduction in the electrical conductivity of the leaf spring can be decreased and, in addition, the reduction in the spring strength can be decreased.

According to the present invention, even when the leaf spring has a decreased thickness, the reduction in the spring strength of the leaf spring against vertical bending and in the spring strength against lateral bending can be decreased.

According to the present invention, the leaf-spring material has a stress at 0.2% strain of not less than 1150 MPa and a stress at 0.025% strain of not less than 1000 MPa. This makes it possible to prevent the problem of deformation of the leaf spring not only when a strong impact is applied to the leaf spring e.g. due to its fall, but also when a small stress is applied many times to the leaf spring.

DESCRIPTION OF THE PREFERRED EMBODIMENTS

First Embodiment

A first embodiment of the present invention will now be described with reference to the drawings.

(Construction of Camera Module Drive Mechanism)

Figure 1:
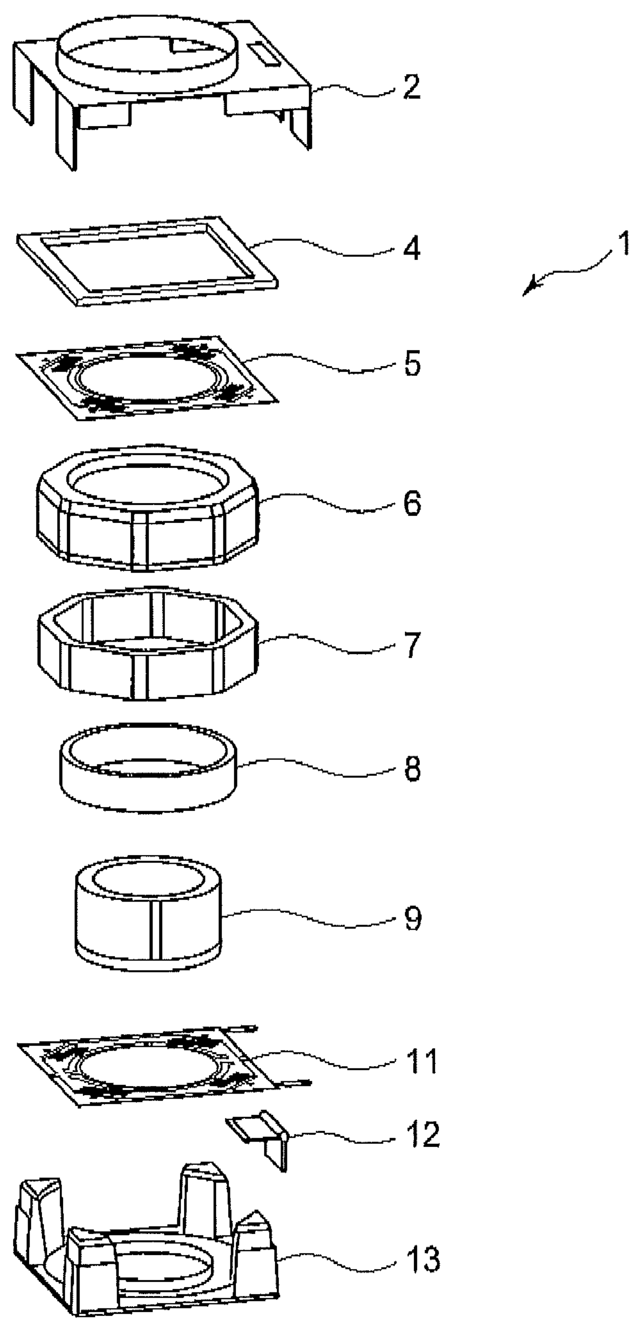
FIG. 1 is an exploded perspective view of a camera module drive mechanism according to a first embodiment.
Figure 2:
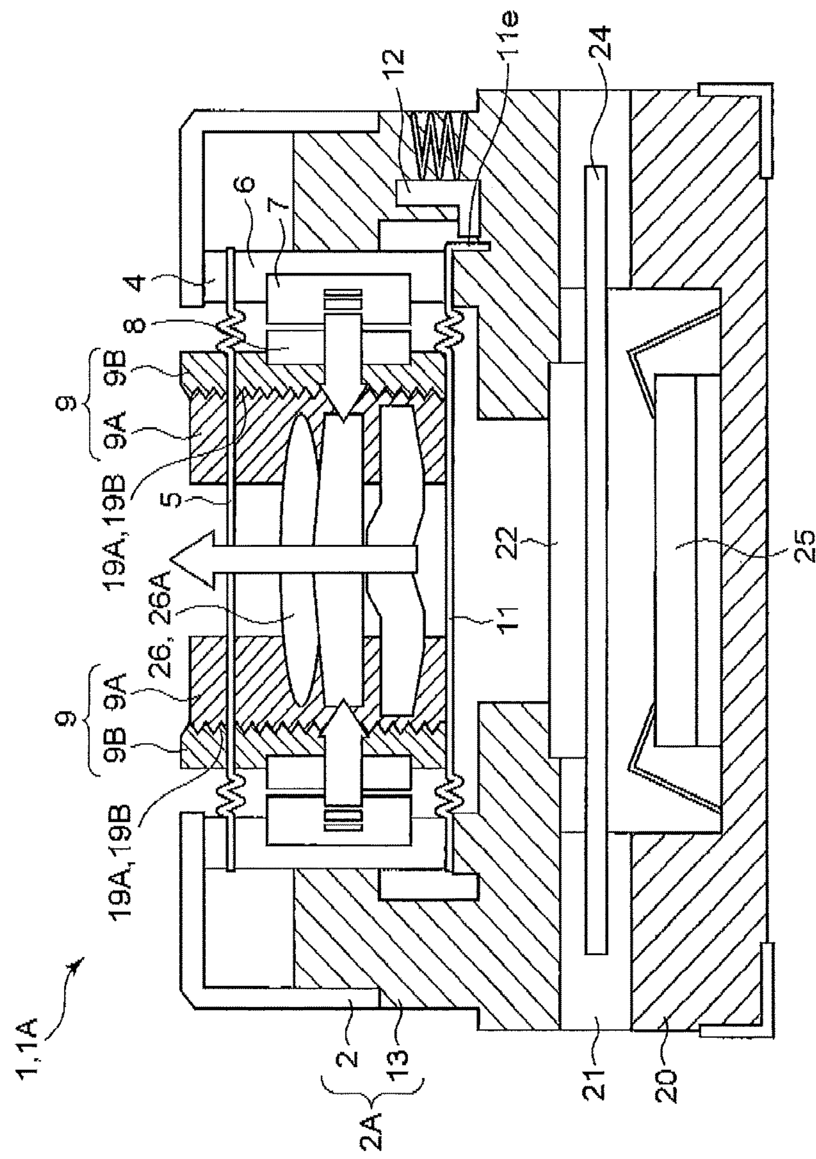
FIG. 2 is a schematic side view of a camera module.

As shown in FIGS. 1 and 2, a camera module drive mechanism 1 according to the present invention includes: a chassis 2A composed of a cover 2 and a base 13; a lens unit 26A composed of a plurality of lenses 26 constituting an optical system; a holder 9 disposed in the chassis 2A and housing the lens unit 26A and which is movable in the direction of the optical axis of the lens unit 26A; a coil 8 provided on the outer periphery of the holder 9; and a yoke 6 and magnet pieces 7, which are provided on the base 15 of the chassis 2A and which provide a magnetic field to the coil 8.

The holder 9 housing the lens unit 26A comprises an inner holder 9A housing the lens unit 26A, and an outer holder 9B provided outside the inner holder 9A and on the outer periphery of which the coil 8 is provided. An external screw 19A is formed on the outer periphery of the inner holder 9A, and an internal screw 19B is formed on the inner periphery of the outer holder 9B so that by engaging the external screw 19A of the inner holder 9A with the internal screw 19B of the outer holder 9B, the inner holder 9A can be screwed into the outer holder 9B.

An upper leaf spring 5 is interposed between the cover 2 of the chassis 2A and an upper portion of the holder 9, and a lower leaf spring 11 is interposed between the base 13 of the chassis 2A and a lower portion of the holder 9.

By applying an electric current to the coil 8 via the lower leaf spring 11, an upward force acts on the holder 9. The upward force opposes the forces of the upper leaf spring 5 and the lower leaf spring 11, and can lift up the lens unit 26A as a whole (see FIG. 2).

By adjusting the input amount of electric current, the force that moves the holder 9 upward can be changed so as to balance the force with the forces of the upper leaf spring 5 and the lower leaf spring 11. This enables adjustment of the vertical movement and the position of the holder 9.

As shown in FIG. 2, the chassis 2A is fixed over a pedestal 20 via an intermediate support 21 which supports a glass plate 29 holding a UV-protective glass 22. An imaging device 25 is disposed on the pedestal 20.

The camera module drive mechanism 1 having the chassis 2A, the intermediate support 21 supporting the UV-protective glass 22 and the glass plate 24, and the pedestal 20 on which the imaging device 25 is disposed, constitute a camera module 1A.

Figure 3:
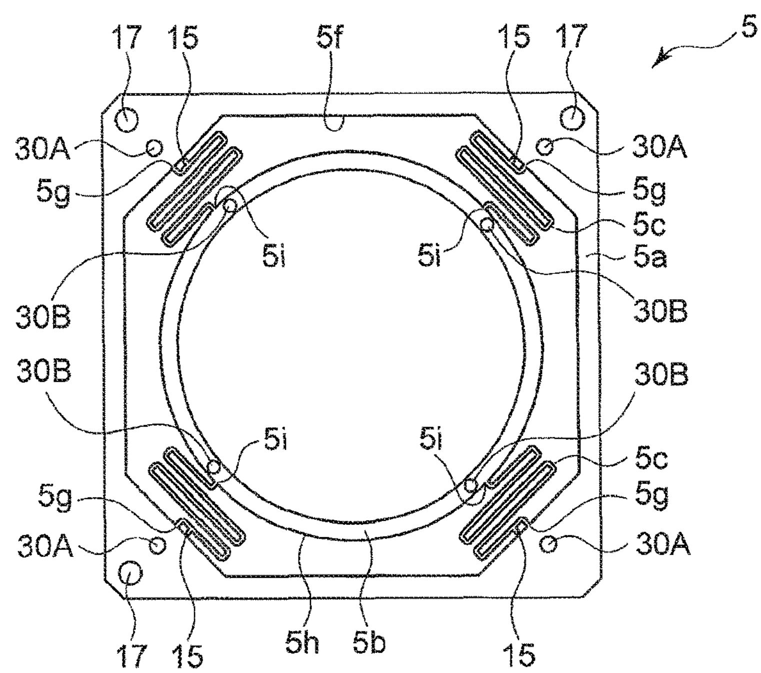
FIG. 3 is a plan view of an upper leaf spring to be incorporated into a camera module drive mechanism.
Figure 4:
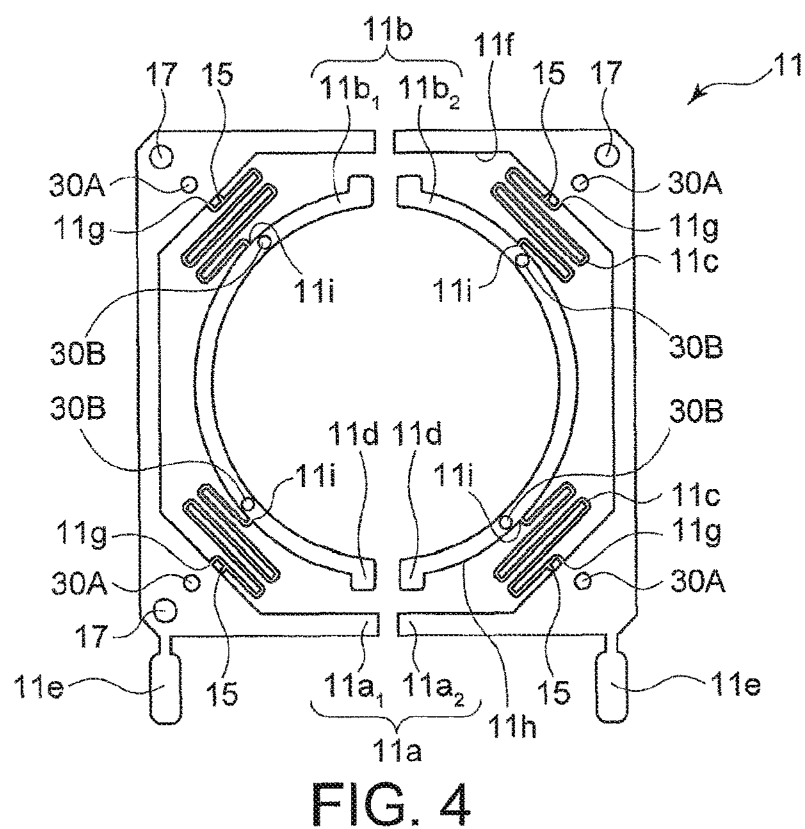
FIG. 4 is a plan view of a lower leaf spring to be incorporated into a camera module drive mechanism.

Of the above components, the upper leaf spring 5 includes a chassis 2A-side outer frame portion 5*a*, a holder 9-side inner frame portion 5*b*, and spring portions 5C having spring properties and provided between the outer frame portion 5*a* and the inner frame portion 5*b*, as shown in FIG. 3. As shown in FIG. 4, the lower leaf spring 11 includes a chassis 2A-side outer frame portion 11*a*, a holder 9-side inner frame portion 11*b*, and spring portions 11C having spring properties and provided between the outer frame portion 11*a* and the inner frame portion 11*b*.

The respective components of the camera module drive mechanism 1 will now be described further.

As described above, the holder 9, consisting of the inner holder 9A holding the lens unit 26A, and the outer holder 9B provided outside the inner holder 9A, is housed in the space in the chassis 2A, composed of the cover 2 and the base 13, such that it can be displaced in the direction of the optical axis of the lens unit 26A.

The inner frame portion 5*b* of the upper leaf spring 5 and the inner frame portion 11*b* of the lower leaf spring 11 are mounted on upper and lower outer circumferential portions of the outer holder 9B of the holder 9. The outer frame portion 5*a* (see FIG. 3) of the upper leaf spring 5 is mounted on the upper surface of the yoke 6 which is secured to the base 13 of the chassis 2A, while the outer frame portion 11*a* (see FIG. 4) of the lower leaf spring 11 is mounted to the base 13 of the chassis 2A.

The magnet pieces 7 are attached to the yoke 6, which assembly constitutes the magnetic circuit of the camera module drive mechanism 1. The coil 8 is disposed within a magnetic field formed by the magnetic circuit. The coil 8 is wound on the outer periphery of the outer holder 9B of the holder 9 so that by supplying an electric current to the coil 8, the holder 9 can be displace in the direction of the optical axis of the lens unit 26A. In FIG. 2, the member with reference numeral 12 is a conductor (e.g. a flexible printed circuit board) for supplying an electric current from an external power source to the coil 8, and the member with reference numeral 4 is a regulation plate mounted on the upper surface of the upper leaf spring 5.

The camera module 1A can be incorporated and used in an electronic terminal, for example, a compact electronic device with a camera, such as a cellular phone, a smartphone, a tablet terminal or a notebook PC. Such an electronic terminal is also provided according to this embodiment.

(Construction of Leaf Spring)

The upper leaf spring 5 and the lower leaf spring 11 will now be further described with reference to FIGS. 3 and 4.

The upper leaf spring 5 and the lower leaf spring 11 are each produced by using a metal leaf-spring material, such as a copper alloy, as described below.

As shown in FIG. 3, the upper leaf spring 5 includes the square outer frame portion 5*a*, the ring-shaped inner frame portion 5*b* disposed on the side of the outer holder 9B of the holder 9 and inside the outer frame portion 5*a*, and the spring portions 5*c* provided between the outer frame portion 5*a* and the inner frame portion 5*b* and having spring properties that allow the outer frame portion 5*a* and the inner frame portion 5*b* to expand/contract in the normal direction of the upper leaf spring 5.

The outer frame portion 5*a* has an inner periphery 5*f*, and is provided with connecting portions 5*g* located on the inner periphery 5*f* and near the four corners, and connecting the outer frame portion 5*a* to the spring portions 5*c*. Further, the outer frame portion 5*a*, in three of the four corners, has positioning holes 17 for positioning of the upper leaf spring 5 upon its mounting to the upper surface of the yoke 6 which is secured to the base 13 of the chassis 2A. The positioning holes 17 engage positioning protrusions (not shown) provided on the upper surface of the yoke 6, thereby accurately positioning the upper leaf spring 5 with respect to the yoke 6.

The outer frame portion 5*a* also has attachment portions 30A for mounting the upper leaf spring 5 to the chassis 2A. The attachment portions 30A are provided in the four corners of the outer frame portion 5*a* and close to the connecting portions 5*g* connecting the outer frame portion 5*a* to the spring portions 5*c*. The plurality of (four) attachment portions 30A are arranged at predetermined intervals in the circumferential direction of the outer frame portion 5*a*.

On the other hand, the inner frame portion 5*b* has a circular outer periphery 5*h*, and is provided with connecting portions 5*i* located on the outer periphery 5*h* and near the four corners, and connecting the inner frame portion 5*b* to the spring portions 5*c*. The inner frame portion 5*b* also has attachment portions 30B for mounting the upper leaf spring 5 to the outer holder 9B of the holder 9. The attachment portions 30B are provided in the four corners of the inner frame portion 5*b* and close to the connecting portions 5*i* connecting the inner frame portion 5*b* to the spring portions 5*c*. The plurality of (four) attachment portions 302 are arranged at predetermined intervals in the circumferential direction of the inner frame portion 5*b*.

As shown in FIG. 3, each spring portion 5*c* has a serpentine shape formed by a multi-folded narrow line.

The lower leaf spring 11 will now be described with reference to FIG. 4. For the lower leaf spring 11 shown in FIG. 4, the same reference numerals as used for the upper leaf spring 5 shown in FIG. 3 are used to refer to the same components, and a detailed description thereof is partly omitted.

As shown in FIG. 4, the lower leaf spring 11 includes the square outer frame portion 11*a*, the ring-shaped inner frame portion 11*b* disposed on the side of the outer holder 9B of the holder 9 and inside the outer frame portion 11*a*, and the spring portions 11*c* provided between the outer frame portion 11*a* and the inner frame portion 11*b* and having spring properties that allow the outer frame portion 11*a* and the inner frame portion 11*b* to expand/contract in the normal direction of the lower leaf spring 11.

The outer frame portion 11*a*, has an inner periphery 11*f*, and is provided with connecting portions 11*g* located on the inner periphery 11*f* and near the four corners, and connecting the outer frame portion 11*a* to the spring portions 11*c*. The outer frame portion 11*a* also has attachment portions 30A for mounting the lower leaf spring 11 to the base 13 of the chassis 2A.

On the other hand, the inner frame portion 11*b* has a circular outer periphery 11*h*, and is provided with connecting portions 11*i* located on the outer periphery 11*h* and near the four corners, and connecting the inner frame portion 11*b* to the spring portions 11*c*. The inner frame portion 11*b* also has attachment portions 30B for mounting the lower leaf spring 11 to the outer holder 9B of the holder 9.

Each spring portion 11*c* has a serpentine shape formed by a multi-folded narrow line.

The outer frame portion 11*a* of the lower leaf spring 11 is provided with a pair of connecting terminals 11*e*, 11*e* to be connected to an external power source. The connecting terminals 11*e*, 11*e* are electrically connected to the external power source e.g. by soldering between the connecting terminals 11*e*, 11*e* and the external flexible printed circuit board 12 (FIG. 2).

The inner frame portion 11*b* is provided with a pair of connecting terminals 11*d*, 11*d* for electrical connection to the coil 8. The connecting terminals 11*d*, 11*d* are electrically connected to the coil 8 (FIG. 2) e.g. by soldering between the connecting terminals 11*d*, 11*d* and the coil 8. An electric current can thus be applied from the external power source to the coil 8 via the lower leaf spring 11.

As shown in FIG. 4, the outer frame portion 11*a* consists of a pair of spaced-apart outer frame members $\mathbf{11}a_1$, $\mathbf{11}a_2$ so that the connecting terminals 11*e*, 11*e* will not short-circuit. Further, the inner frame portion 11*b* consists of a pair of spaced-apart outer frame members $\mathbf{11}b_1$, $\mathbf{11}b_2$ so that the connecting terminals 11*d*, 11*d* will not short-circuit.

In FIGS. 3 and 4, the four spring portions 5*c*, 11*c* are symmetrical with respect to a central axis of the leaf spring 5, 11, extending vertically or laterally in FIGS. 3 and 4. However, the present invention is not limited to this feature. For example, the four spring portions 5*c*, 11*c* may have 90-degree rotational symmetry.

As shown in FIGS. 3 and 4, the upper leaf spring 5 and the lower leaf spring 11 have the square outer frame portions 5*a*, 11*a* which cover the entire circumferences of the inner frame portions 5*b*, 11*b*. However, the present invention is not limited to this feature. For example, the outer frame portions 5*a*, 11*a* may each be composed of four corner portions 5*s*.

Figure 12:
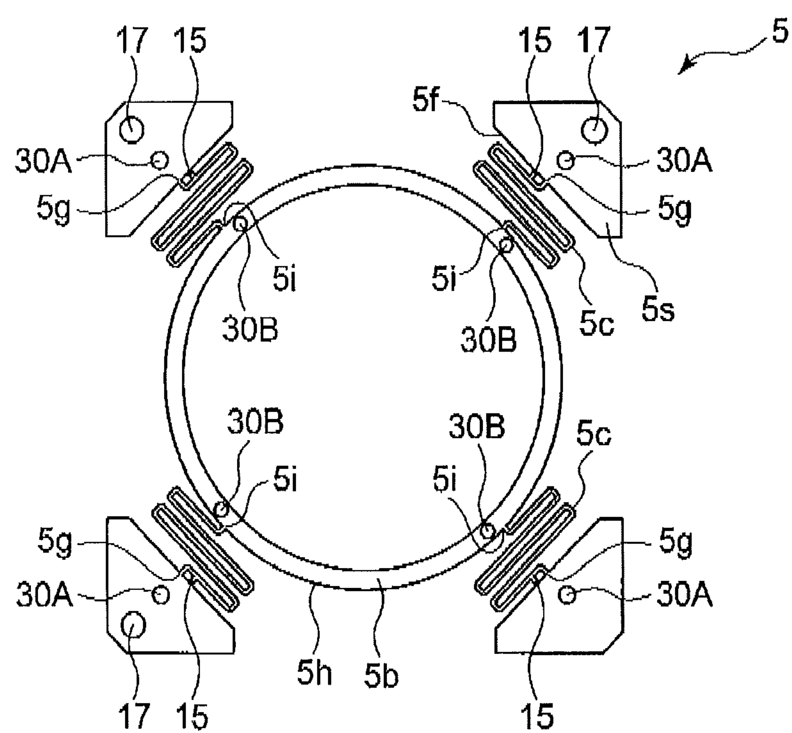
FIG. 12 a diagram showing a variation of the upper leaf spring.

FIG. 12 shows an upper leaf spring 5 including an outer frame portion 5*a* consisting of four corner portions 5*s*. As with the outer frame portion 5*a*, the outer frame portion 11*a* of the lower leaf spring 11 may also consist of four corner portions.

As shown in FIG. 12, the upper leaf spring 5 includes the outer frame portion 5*a* consisting of the four corner portions 5*s*, the ring-shaped inner frame portion 5*b* disposed on the side of the outer holder 9B of the holder 9 and inside the outer frame portion 5*a*, and the spring portions 5*c* provided between the outer frame portion 5*a* and the inner frame portion 5*b* and having spring properties that allow the outer frame portion 5*a* and the inner frame portion 5*b* to expand/contract in the normal direction of the upper leaf spring 5.

Each corner portion 5*s* of the outer frame portion 5*a* has an inner periphery 5*f*, and has a connecting portion 5*g* located on the inner periphery 5*f* and connecting the outer frame portion 5*a* to the spring portion 5*c*. Further, the outer frame portion 5*a*, in three of the four corner portions 5*s*, has positioning holes 17 for positioning of the upper leaf spring 5 upon its mounting to the upper surface of the yoke 6 which is secured to the base 13 of the chassis 2A. The positioning holes 17 engage positioning protrusions (not shown) provided on the upper surface of the yoke 6, thereby accurately positioning the upper leaf spring 5 with respect to the yoke 6.

The corner portions 5*s* of the outer frame portion 5*a* also have attachment portions 30A for mounting the upper leaf spring 5 to the chassis 2A. The attachment portions 30A are provided in the four corner portions 5*s* of the outer frame portion 5*a* and close to the connecting portions 5*g* connecting the corner portions 5*s* to the spring portions 5*c*.

On the other hand, the inner frame portion 5*b* has a circular outer periphery 5*h*, and is provided with connecting portions 5*i* located on the outer periphery 5*h* and near the four corners, and connecting the inner frame portion 5*b* to the spring portions 5*c*. The inner frame portion 5*b* also has attachment portions 30B for mounting the upper leaf spring 5 to the outer holder 9B of the holder 9. The attachment portions 30B are provided in the four corners of the inner frame portion 5*b* and close to the connecting portions 5*i* connecting the inner frame portion 5*b* to the spring portions 5*c*. The plurality of (four) attachment portions 30B are arranged at predetermined intervals in the circumferential direction of the inner frame portion 5*b*.

As shown in FIG. 12, each spring portion 5*c* has a serpentine shape formed by a multi-folded narrow line. As shown in FIGS. 3, 4 and 12, each spring portion 5*c* has a regulating protrusion 15 projecting outward from the spring portion 5*c* in the planar direction to prevent deformation of the spring portion 5*c* in the planar direction; however, each spring portion 5*c* may not necessarily have the regulating protrusion 15.

Materials for the upper leaf spring 5 and the lower leaf spring 11 will now be described. Both of the upper leaf spring 5 and the lower leaf spring 11 can be produced by etching of a metal plate made of, for example, a copper alloy.

The upper leaf spring 5 and the lower leaf spring 11 may each have a thickness of, for example, 20 μm to 100 μm.

Specific Example

A specific example of the upper leaf spring 5 and the lower leaf spring 11 will now be described.

As described above, both of the upper leaf spring 5 and the lower leaf spring 11 can be produced by etching of a metal plate made of, for example, a copper-based alloy (Cu-based alloy).

The copper-based alloy may be exemplified by titanium-copper (Cu—Ti) which comprises the following components;

Titanium-Copper

Cu: balance

Ti: 2.9-3.5%

The titanium-copper has an electrical conductivity of not less than 8% IACS, preferably 8% to 13% IACS, and a 0.2% proof stress of not less than 900 MPa, preferably 900 to 1200 MPa.

The abbreviation IACS refers to International Annealed Copper Standard, and the electric conductivity is expressed in a percentage based on the electrical conductivity of pure copper.

The titanium-copper has a Vickers hardness of not less than 290 HV, preferably 290 to 370 HV. The titanium-copper does not contain beryllium (Be). Since the upper leaf spring 5 and the lower leaf spring 11 do not contain a substance of concern such as beryllium, they can be easily disposed of as industrial waste.

The upper leaf spring 5 and the lower leaf spring 11 can also be produced using a Cu-based alloy other than titanium-copper or an Fe-based alloy.

Examples of the Cu-based alloy other than titanium-copper and the Fe-based alloy are described below as Comparative Examples 1 to 5.

Comp. Example 1

Cu: balance

Ni: 20.0-22.0%

Sn: 4.5-5.7%

Comp. Example 2

Cu: balance

Ni: 14.5-15.5%

Sn: 7.5-8.5%

Comp. Example 3

Cu: balance

B: 0.15-2.0%

Comp. Example 4

Cu: not less than 97%

Comp. Example 5

Fe: balance

Cr: 16-18%

Ni: 1-2%

Mn: 14-18%

Some physical properties of the titanium-copper (this embodiment) and those of the alloys of Comp. Examples 1 to 5 are shown below in Table-1.

TABLE 1

| | Substance of concern (beryllium) | Electrical conductivity (IACS) | 0.2% proof stress (MPa) | Vickers hardness (HV) |
|---|---|---|---|---|
| This Embodiment | ○ | 8-13% ○ | 900-1200 ○ | 290-370 ○ |
| Comp. Example 1 | ○ | 6% Δ | 800-1100 ○ | 270-360 ○ |
| Comp. Example 2 | ○ | 7% Δ | 515-1170 Δ | 305-405 ○ |
| Comp. Example 3 | X | 25~63% ◎ | 1300- ○ | 360-410 ○ |
| Comp. Example 4 | ○ | 65% ◎ | 505-555 X | 150-170 X |
| Comp. Example 5 | ○ | 2.37% X | 1600- ◎ | 535 ◎ |

In Table-1, the “substance of concern” is evaluated by the presence/absence of beryllium in the Cu-based alloys or the Fe-based alloy. The unit of the electrical conductivity is an IACS unit, the unit of the 0.2% proof stress is MPa, and the unit of the Vickers hardness is HV.

In Table-1, “○” indicates that a desired physical property was obtained for the substance of concern, the electrical conductivity, the 0.2% proof stress or the Vickers hardness; “◎” indicates that an excellent physical property was obtained for the test item; “Δ” indicates that a desired physical property was not obtained for the test item; and “X” indicates that a significantly inferior physical property was obtained for the test item.

It is apparent from Table-1 that desired physical properties can be obtained for all of the substance of concern, the electrical conductivity, the 0.2% proof stress and the Vickers hardness by using the titanium-copper of this embodiment, comprising the above-described components.

Action of this Embodiment

The action of this embodiment having the above-described construction will now be described.

First, the lens unit 26A is mounted in the chassis 2A. In particular, while engaging the external screw 19A of the inner holder 9A, in which the lens unit 26A is housed, with the internal screw 19B of the outer holder 9B which has previously been secured to the chassis 2P, the inner holder 9A is screwed into the outer holder 9B. When thus screwing the inner holder 9A into the outer holder 9B, the outer holder 9B can also rotate. Along with the rotation of the outer holder 9B, the inner frame portions 5*b*, 11*b* of the leaf springs 5, 11 will rotate in a certain direction, whereby a planar-direction force will be applied to the spring portions 5*c*, 11*c*.

It is also possible that after incorporating the leaf springs 5, 11 into a not-shown electronic terminal, an impact can be applied to the electronic terminal e.g. due to its fall. A planar-direction force will then be applied to the leaf springs 5, 11, which can cause deformation of the leaf springs 5, 11.

It is noted in this regard that according to this embodiment, the leaf springs 5, 11 are made of titanium-copper having a 0.2% proof stress of not less than 900 MPa, preferably 900 to 1200 MPa, and a Vickers hardness of not less than 290 HV, preferably 290 to 370 HV, as described above. The leaf springs 5, 11 can therefore have a sufficiently high spring strength. This makes it possible to prevent the problem of plastic deformation of the spring portions 5*c*, 11*c* upon the application of a planar-direction force to the spring portions 5*c*, 11*c*, thereby preventing a decrease in the yield of the leaf springs 5, 11. Further, after the leaf springs 5, 11 are incorporated into an electronic terminal, a lowering of the driving accuracy of the lenses 26 of the camera module 1A upon their autofocusing operation can be prevented. Thus, the impact resistance of the electronic terminal can be enhanced.

The operation of the camera module drive mechanism will now be described with reference to FIG. 2.

First, an electric current is applied to the coil 8 via the lower leaf spring 11. An interaction occurs between the electric current and a magnetic field of the magnet pieces 7, and an upward force acts on the holder 9 consisting of the inner holder 9A and the outer holder 9B. The upward force opposes the forces of the upper leaf spring 5 and the lower leaf spring 11, and can lift up the lens unit 26A as a whole (see FIG. 2).

By adjusting the amount of the electric current applied to the coil 8, the force that moves the holder 9 upward can be changed so as to balance the force with the forces of the upper leaf spring 5 and the lower leaf spring 11. This enables adjustment of the vertical movement and the position of the holder 9.

In this embodiment the outer frame portions 5*a*, 11*a* of the upper leaf spring 5 and the lower leaf spring 11 are provided with the attachment portions 30A close to the connecting portions 5*g*, 11*g* connecting the outer frame portions 5*a*, 11*e* to the spring portions 5*c*, 11*c*, while the inner frame portions 5*b*, 11*b* are provided with the attachment portions 30B close to the connecting portions 5*i*, 11*i* connecting the inner frame portions 5*b*, 11*b* to the spring portions 5*c*, 11*c*.

By thus firmly fixing both ends of the spring portions 5*c*, 11*c* of the upper leaf spring 5 and the lower leaf spring 11 to the yoke 6 which is secured to the base 13 of the chassis 2A, to the base 13 and to the holder 9, the spring constant of the spring portions 5*c*, 11*c* can be stabilized.

Thus, a camera module drive mechanism having stable spring properties can be obtained.

As described above, according to this embodiment, the upper leaf spring 5 and the lower leaf spring 11 can be produced using titanium-copper having the above-described physical properties. Therefore, even when a planar-direction force is applied to the spring portions 5*c*, 11*c* of the leaf springs 5, 11, no plastic deformation of the leaf springs 5, 11 will occur. Further, the spring portions 5*c*, 11*c* of the leaf springs 5, 11 can exhibit a stable spring constant during the operation of the camera module drive mechanism.

Furthermore, since the titanium-copper constituting the upper leaf spring 5 and the lower leaf spring 11 has a stable electrical conductivity (not less than 8% IACS, preferably 8 to 13% IACS), an electric current can be stably supplied from the lower leaf spring 11 to the coil 8 during the operation of the camera module drive mechanism. This can avoid a problem that may occur in the operation of the camera module drive mechanism due to a failure of the supply of an electric current to the coil 8.

Second Embodiment

A second embodiment of the present invention will now be described with reference to the drawings.

Figure 5:
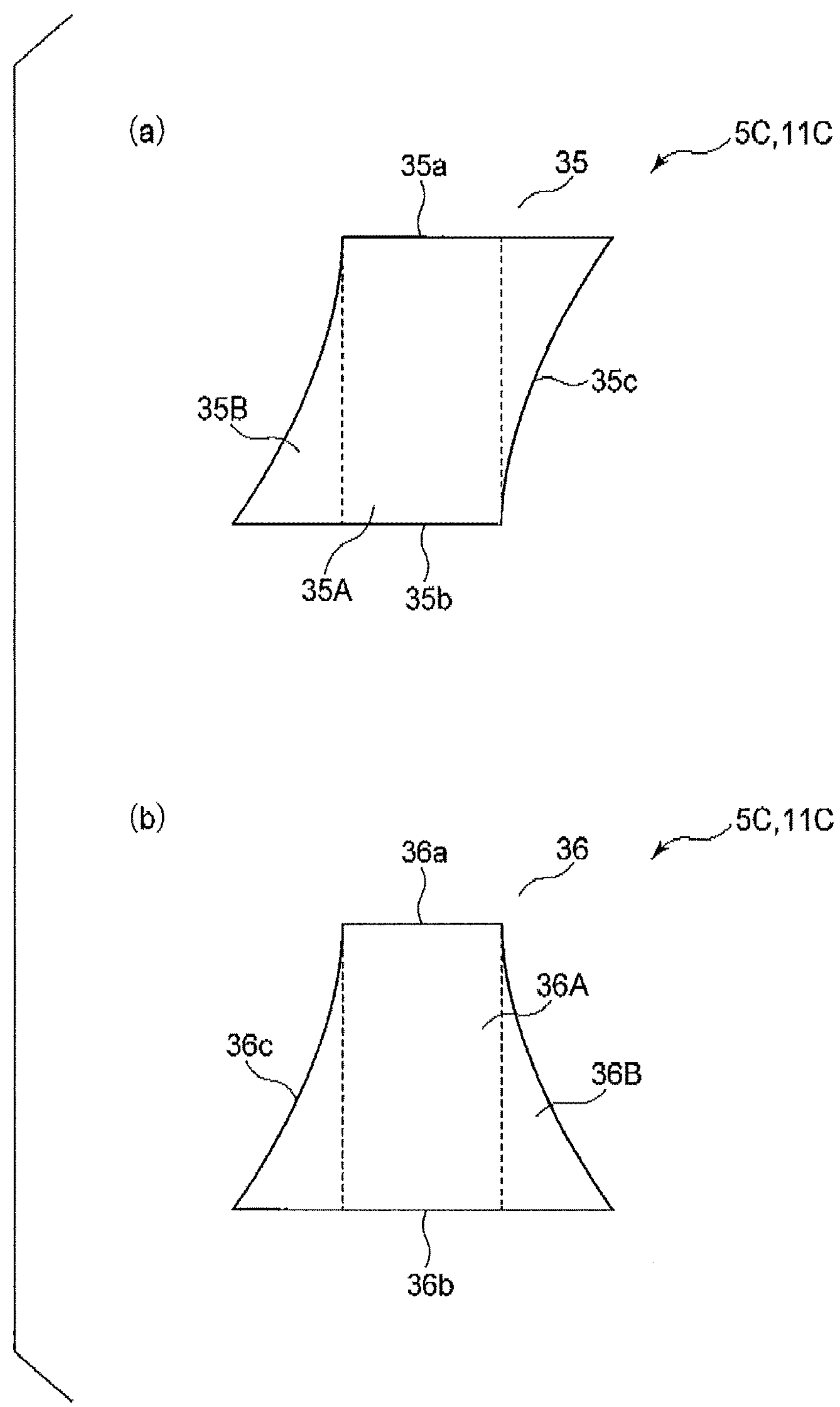
FIG. 5(*a*) is a diagram showing a cross-sectional shape of an upper leaf spring or a lower leaf spring according to a second embodiment, and FIG. 5(*b*) is a diagram showing a variation of the cross-sectional shape of an upper leaf spring or a lower leaf spring.

For the second embodiment shown in FIGS. 5(*a*) and 5(*b*), the same reference numerals as used for the first embodiment shown in FIGS. 1 through 4 are used to refer to the same components, and a detailed description thereof is omitted.

A cross-sectional shape of an upper leaf spring 5 and a lower leaf spring 11 will be described with reference to FIGS. 5(*a*) and 5(*b*).

The spring portions 5*c*, 11*c* of the upper leaf spring 5 and the lower leaf spring 11 are subjected to a vertical bending action and a lateral bending action. In particular, the spring portions 5*c*, 11*c* are subjected to a vertical bending action during the operation of the camera module drive mechanism. Further, when screwing the inner holder 9A into the outer holder 9B during assembly of the camera module drive mechanism, the spring portions 5*c*, 11*c* are subjected to a lateral bending action.

In view of this, at least the spring portions 5*c* of the upper leaf spring 5 and the spring portion 11*c* of the lower leaf spring 11 have a cross-sectional shape as shown in FIG. 5(*a*) so that they can respond to the above-described vertical and lateral bending actions.

As shown in FIG. 5(*a*), the cross-sectional shape 35 of, the spring portions 5*c*, 11*e* is an approximately parallelogram shape composed of an upper side 35*a* and a lower side 35*b* which are parallel to each other, and a pair of sides 35*c*, 35*c* extending between the upper side 35*a* and the lower side 35*b*. The sides 35*c*, 35*c* of the approximately parallelogram cross-sectional shape 35 are curved inward.

Since the sides 35*c*, 35*c* of the approximately parallelogram cross-sectional shape 35 are curved inward, when vertically bending the spring portions 5*c*, 11*c*, the section modulus of the spring portions 5*c*, 11*c* for the vertical bending can be increased as compared to the case where the spring portions 5*c*, 11*c* have a simple parallelogram cross-sectional shape.

Furthermore, the cross-sectional shape 35 of the spring portions 5*c*, 11*c*, which is an approximately parallelogram shape, consists of a rectangular portion 35A and projecting portions 350 projecting laterally from the rectangular portion 35A. Therefore, when laterally bending the spring portions 5*c*, 11*c*, the section modulus of the spring portions 5*c*, 11*c* for the lateral bending can be increased as compared to the case where the spring portions 5*c*, 11*c* have a simple rectangular cross-sectional shape.

Other portions of the upper leaf spring 5 and the lower leaf spring 11 than the spring portions 5*c*, 11*c* may have either an approximately parallelogram cross-sectional shape as with the spring portions 5_c_, 11_c_ and as shown in FIG. 5(_a_), or a simple rectangular cross-sectional shape.

Alternatively, the spring portions 5_c_, 11_c_ of the upper leaf spring 5 and the lower leaf spring 11 may have an approximately trapezoidal cross-sectional shape 36 composed of an upper side 36_a_ and a lower side 36_b_ which are parallel to each other, and a pair of sides 36_c_, 36_c_ extending between the upper side 36_a_ and the lower side 36_b_.

In FIG. 5(_b_), the sides 36_c_, 36_a_ of the trapezoidal cross-sectional shape 36 are curved inward.

Since the sides 36_c_, 36_c_ of the trapezoidal cross-sectional shape 36 are curved inward, when vertically bending the spring portions 5_c_, 11_c_, the section modulus of the spring portions 5_c_, 11_c_ for the vertical bending can be increased as compared to the case where the spring portions 5_c_, 11_c_ have a simple trapezoidal cross-sectional shape.

Furthermore, the cross-sectional shape 36 of the spring portions 5_c_, 11_c_, which is an approximately trapezoidal shape, consists of a rectangular portion 36A and projecting portions 36B projecting laterally from the rectangular portion 36A. Therefore, when laterally bending the spring portions 5_c_, 11_c_, the section modulus of the spring portions 5_c_, 11_c_ for the lateral bending can be increased as compared to the case where the spring portions 5_c_, 11_c_ have a simple rectangular cross-sectional shape.

Other portions of the upper leaf spring 5 and the lower leaf spring 11 than the spring portions 5_c_, 11_c_ may have either an approximately trapezoidal cross-sectional shape as with the spring portions 5_c_, 11_c_ and as shown in FIG. 5(_b_), or a simple trapezoidal cross-sectional shape.

Operation of this Embodiment

The operation of this embodiment having the above-described construction will now be described.

First, the lens unit 26A is mounted in the chassis 2A. In particular, while engaging the external screw 19A of the inner holder 9A, in which the lens unit 26A is housed, with the internal screw 19B of the outer holder 95 which has previously been secured to the chassis 2A, the inner holder 9A is screwed into the outer holder 95. When thus screwing the inner holder 9A into the outer holder 95, the outer holder 9B can also rotate. Along with the rotation of the outer holder 9B, the inner frame portions 5_b_, 11_b_ of the leaf springs 5, 11 will rotate in a certain direction, whereby a planar-direction (lateral) force will be applied to the spring portions 5_c_, 11_d_.

It is also possible that after incorporating the leaf springs 5, 11 into a not-shown electronic terminal, an impact can be applied to the electronic terminal e.g. due to its fail. A planar-direction force will then be applied to the leaf springs 5, 11, which can cause deformation of the leaf springs 5, 11.

It is noted in this regard that according to this embodiment, the spring portions 5_c_, 11_c_ of the upper leaf spring 5 and the lower leaf spring 11 have the above-described cross-sectional shape 35, 36 (see FIGS. 5(_a_) and 5(_b_)), which can increase the section modulus of the spring portions 5_c_, 11_c_ for lateral bending. Therefore, the spring portions 5_c_, 11_c_ can have sufficient spring strength against lateral bending. This makes it possible to prevent the problem of plastic deformation of the spring portions 5_c_, 11_c_ upon the application of a planar-direction force to the spring portions 5_c_, 11_c_, thereby preventing a decrease in the yield of the leaf springs 5, 11. Further, after the leaf springs 5, 11 are incorporated into an electronic terminal, a lowering of the driving accuracy of the lenses 26 of the camera module 1A upon their autofocusing operation can be prevented. Thus, the impact resistance of the electronic terminal can be enhanced.

The operation of the camera module drive mechanism will now be described with reference to FIG. 2.

First, an electric current is applied to the coil 8 via the lower leaf spring 11. An interaction occurs between the electric current and a magnetic field of the magnet pieces 7, and an upward force acts on the holder 9 consisting of the inner holder 9A and the outer holder 9B. The upward force opposes the forces of the upper leaf spring 5 and the lower leaf spring 11, and can lift up the lens unit 26A as a whole (see FIG. 2).

During the above operation, the spring portions 5_c_, 11_c_ of the leaf springs 5, 11 are subjected to a vertical bending action. In this embodiment the spring portions 5_c_, 11_c_ of the upper leaf spring 5 and the lower leaf spring 11 have the above-described cross-sectional shape 35, 36 (see FIGS. 5(_a_) and 5(_b_)), which can increase the section modulus of the spring portions 5_c_, 11_c_ for vertical bending. Therefore, the spring portions 5_c_, 11_c_ can have sufficient spring strength against vertical bending.

By adjusting the amount of the electric current applied to the coil 8, the force that moves the holder 9 upward can be changed so as to balance the force with the forces of the upper leaf spring 5 and the lower leaf spring 11. This enables adjustment of the vertical movement and the position of the holder 9.

In this embodiment the outer frame portions 5_a_, 11_a_ of the upper leaf spring 5 and the lower leaf spring 11 are provided with the attachment portions 30A close to the connecting portions 5_g_, 11_g_ connecting the outer frame portions 5_a_, 11 to the spring portions 5_c_, 11_c_, while the inner frame portions 5_b_, 11_b_ are provided with the attachment portions 30B close to the connecting portions 5_i_, 11_i_ connecting the inner frame portions 5_b_, 11_b_ to the spring portions 5_c_, 11_c_.

By thus firmly fixing both ends of the spring portions 5_c_, 11_c_ of the upper leaf spring 5 and the lower leaf spring 11 to the yoke 6 which is secured to the base 13 of the chassis 2A, to the base 13 and to the holder 9, the spring constant of the spring portions 5_c_, 11_c_ can be stabilized.

Thus, a camera module drive mechanism having stable spring properties can be obtained.

As described hereinabove, according to this embodiment, the spring portions 5_c_, 11_c_ of the upper leaf springs 5, 11 have the above-described cross-sectional shape 35, 36, and therefore can have sufficient spring strength against vertical bending and lateral bending. Therefore, even when the spring portions 5_c_, 11_c_ are subjected to a vertical or lateral bending action, there will be no plastic deformation of the leaf springs 5, 11. Further, the spring portions 5_c_, 11_c_ of the upper leaf spring 5 and the lower leaf spring 11 can exhibit a stable spring constant during the operation of the camera module drive mechanism.

Third Embodiment

A third embodiment of the present invention will now be described with reference to FIGS. 6 through 11.

For the third embodiment shown in FIGS. 6 through 11, the same reference numerals as used for the first embodiment shown in FIGS. 1 through 4 are used to refer to the same components, and a detailed description thereof is omitted.

(Construction of Camera Module Drive Mechanism)

Figure 6:
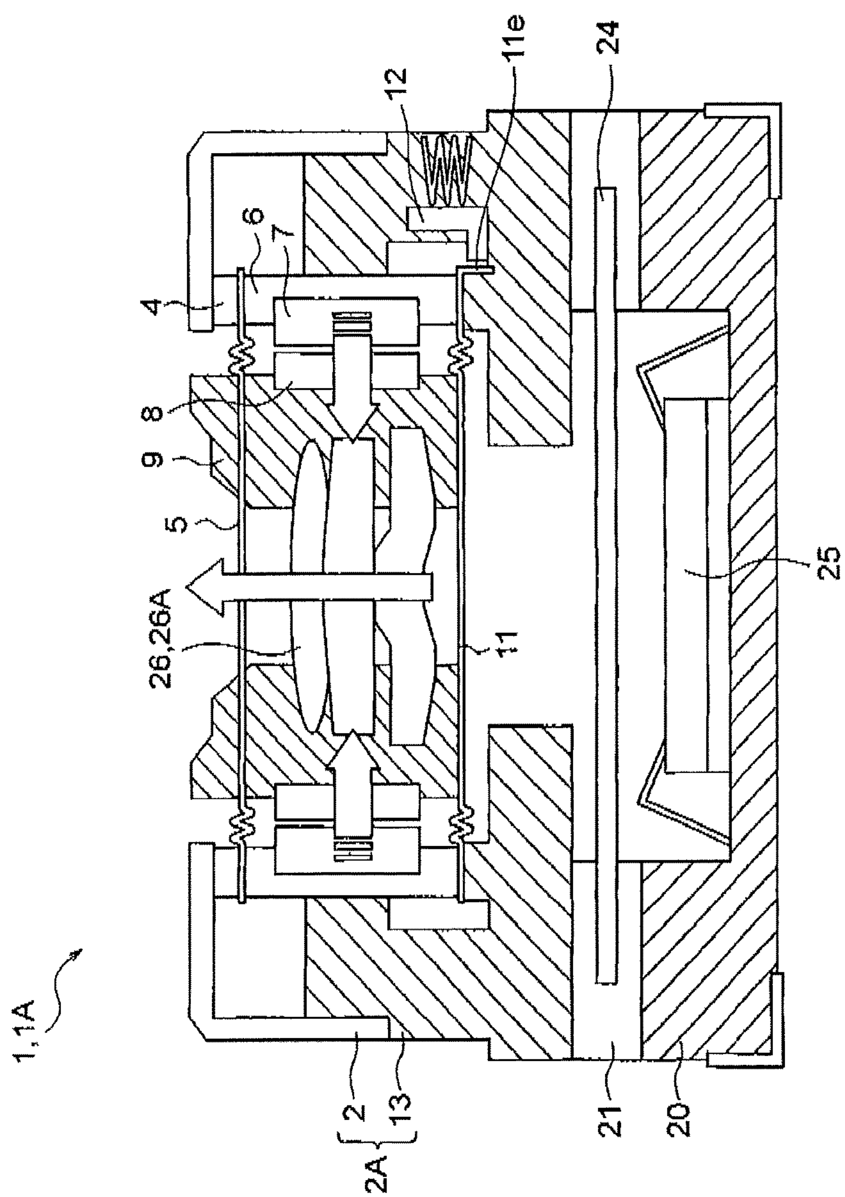
FIG. 6 is a schematic side view of a camera module according to a third embodiment.

As shown in FIGS. 1 and 6, a camera module drive mechanism 1 according to the present invention includes: a chassis 2A composed of a cover 2 and a base 13; a lens unit 26A composed of a plurality of lenses 26 constituting an optical system; a holder 9 disposed in the chassis 2A and housing the lens unit 26A and which is movable in the direction of the optical axis of the lens unit 26A; a coil 8 provided on the outer periphery of the holder 9; and a yoke 6 and magnet pieces 7, which are provided on the base 13 of the chassis 2A and which provide a magnetic field to the coil 8.

An upper leaf spring 5 is interposed between the cover 2 of the chassis 2A and an upper portion of the holder 9, and a lower leaf spring 11 is interposed between the base 13 of the chassis 2A and a lower portion of the holder 9.

By applying an electric current to the coil 8 via the lower leaf spring 11, an upward force acts on the holder 9. The upward force opposes the forces of the upper leaf spring 5 and the lower leaf spring 11, and can lift up the lens unit 26A as a whole (see FIG. 6).

By adjusting the input amount of electric current, the force that moves the holder 9 upward can be changed so as to balance the force with the forces of the upper leaf spring 5 and the lower leaf spring 11. This enables adjustment of the vertical movement and the position of the holder 9.

As shown in FIG. 6, the chassis 2A is fixed over a pedestal 20 via an intermediate support 21 which supports a UV-protective glass 24. An imaging device 25 is disposed on the pedestal 20.

The camera module drive mechanism 1 having the chassis 2A, the intermediate support 21 supporting the UV-protective glass 24, and the pedestal 20 on which the imaging device 25 is disposed, constitute a camera module 1A.

Figure 7:
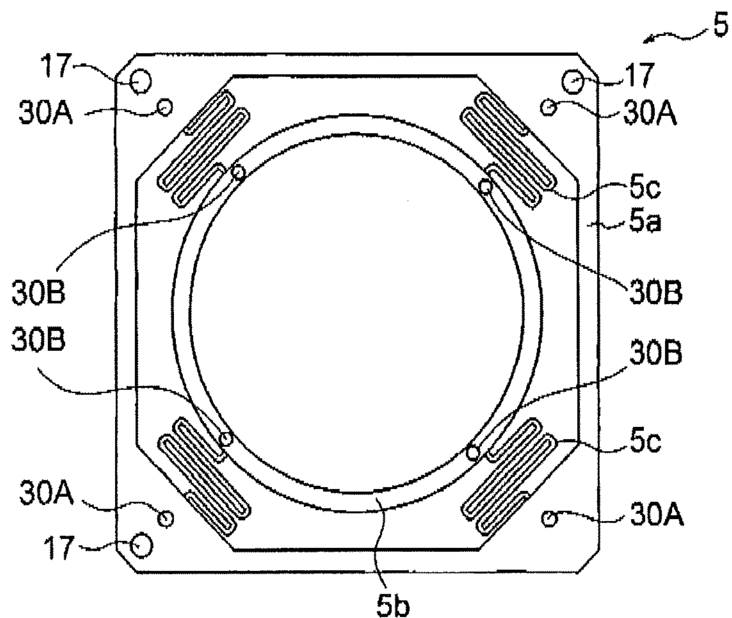
FIG. 7 is a plan view of an upper leaf spring to be incorporated into a camera module drive mechanism.
Figure 8:
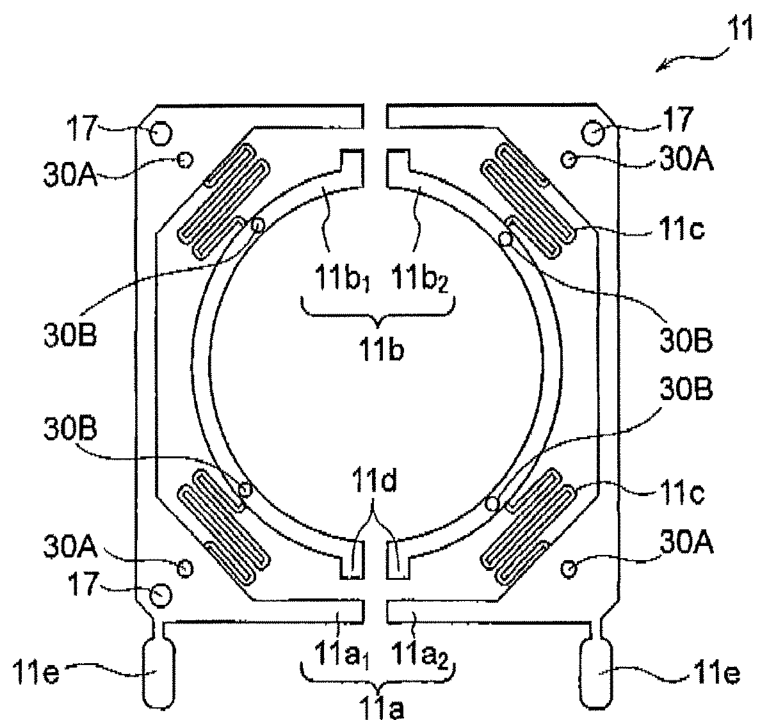
FIG. 8 is a plan view of a lower leaf spring to be incorporated into a camera module drive mechanism.

Of the above components, the upper leaf spring 5 includes a chassis 2A-side outer frame portion 5*a*, a holder 9-side inner frame portion 5*b*, and spring portions 5C having spring properties and provided between the outer frame portion 5*a* and the inner frame portion 5*b*, as shown in FIG. 7. As shown in FIG. 8, the lower leaf spring 11 includes a chassis 2A-side outer frame portion 11*a*, a holder 9-side inner frame portion 11*b*, and spring portions 11C having spring properties and provided between the outer frame portion 11*a* and the inner frame portion 11*b*.

The respective components of the camera module drive mechanism 1 will now be described further.

As described above, the holder 9 holding the lens unit 26A is housed in the space in the chassis 2A, composed of the cover 2 and the base 13, such that it can be displaced in the direction of the optical axis of the lens unit 26A.

The inner frame portion 5*b* of the upper leaf spring 5 and the inner frame portion 11*b* of the lower leaf spring 11 are mounted on upper and lower outer circumferential portions of the holder 9. The outer frame portion 5*a* (see FIG. 7) of the upper leaf spring 5 is mounted on the upper surface of the yoke 6 which is secured to the base 13 of the chassis 2A, while the outer frame portion 11*a* (see FIG. 8) of the lower leaf spring 11 is mounted to the base 13 of the chassis 2A.

The magnet pieces 7 are attached to the yoke 6, which assembly constitutes the magnetic circuit of the camera module drive mechanism 1. The coil 8 is disposed within a magnetic field formed by the magnetic circuit. The coil 8 is wound on the outer periphery of the holder 9 so that by supplying an electric current to the coil 8, the holder 9 can be displace in the direction of the optical axis of the lens unit 26A. In FIG. 6, the member with reference numeral 12 is a conductor (e.g. a flexible printed circuit board), and the member with reference numeral 4 is a regulation plate mounted on the upper surface of the upper leaf spring 5.

The camera module 1A can be incorporated and used in an electronic terminal 50 (see FIG. 10), for example, a compact electronic device with a camera, such as a cellular phone, a smartphone, a tablet terminal or a notebook PC. Such an electronic terminal 50 is also provided according to this embodiment.

(Construction of Leaf Spring)

The upper leaf spring 5 and the lower leaf spring 11 will now be further described with reference to FIGS. 7 and 8.

The upper leaf spring 5 and the lower leaf spring 11 are each produced by using a copper alloy leaf-spring material 40 (FIGS. 9(*a*) through 9(*g*)) as described below.

As shown in FIG. 7, the upper leaf spring 5 includes the square outer frame portion 5*a*, the ring-shaped inner frame portion 5*b* disposed on the side of the holder 9 and inside the outer frame portion 5*a*, and the spring portions 5*c* provided between the outer frame portion 5*a* and the inner frame portion 5*b* and having spring properties that allow the outer frame portion 5*a* and the inner frame portion 5*b* to expand/contract in the normal direction of the upper leaf spring 5.

The outer frame portion 5*a*, in three of the four corners, has positioning holes 17 for positioning of the upper leaf spring 5 upon its mounting to the upper surface of the yoke 6 which is secured to the base 13 of the chassis 2A. The positioning holes 17 engage positioning protrusions (not shown) provided on the upper surface of the yoke 6, thereby accurately positioning the upper leaf spring 5 with respect to the yoke 6.

The outer frame portion 5*a* also has attachment portions 30A for mounting the upper leaf spring 5 to the chassis 2A. The attachment portions 30A are provided in the four corners of the outer frame portion 5*a* and close to connecting portions connecting the outer frame portion 5*a* to the spring portions 5*c*. The plurality of (four) attachment portions 30A are arranged at predetermined intervals in the circumferential direction of the outer frame portion 5*a*.

On the other hand, the inner frame portion 5*b* has attachment portions 30B for mounting the upper leaf spring 5 to the holder 9. The attachment portions 30B are provided in the four corners of the inner frame portion 5*b* and close to connecting portions connecting the inner frame portion 5*b* to the spring portions 5*c*. The plurality of (four) attachment portions 30B are arranged at predetermined intervals in the circumferential direction of the inner frame portion 5*b*.

The lower leaf spring 11 will now be described with reference to FIG. 8. For the lower leaf spring 11 shown in FIG. 8, the same reference numerals as used for the upper leaf spring 5 shown in FIG. 7 are used to refer to the same components, and a detailed description thereof is omitted.

As shown in FIG. 8, the lower leaf spring 11 includes the square outer frame portion 11*a*, the ring-shaped inner frame portion 11*b* disposed on the side of the holder 9 and inside the outer frame portion 11*a*, and the spring portions 11*c* provided between the outer frame portion 11*a* and the inner frame portion 11*b* and having spring properties that allow the outer frame portion 11*a* and the inner frame portion 11*b* to expand/contract in the normal direction of the lower leaf spring 11.

The outer frame portion 11*a* has attachment portions 30A for mounting the lower leaf spring 11 to the base 13 of the chassis 2A. The attachment portions 30A are provided in the four corners of the outer frame portion 11*a* and close to connecting portions connecting the outer frame portion 11*a* to the spring portions 11*c*. The plurality of (four) attachment portions 30A are arranged at predetermined intervals in the circumferential direction of the outer frame portion 11*a*.

On the other hand, the inner frame portion 11*b* has attachment portions 30B for mounting the lower leaf spring 11 to the holder 9. The attachment portions 300 are provided in the inner frame portion 11*b* and close to connecting portions connecting the inner frame portion 11*b* to the spring portions 11*c*. The plurality of (four) attachment portions 300 are arranged at predetermined intervals in the circumferential direction of the inner frame portion 11*b*.

The outer frame portion 11*a* of the lower leaf spring 11 is provided with a pair of connecting terminals 11*e*, 11*e* to be connected to an external power source. The connecting terminals 11*e*, 11*e* are electrically connected to the external power source e.g. by soldering between the connecting terminals 11*e*, 11*e* and the external flexible printed circuit board 12 (FIG. 6).

The inner frame portion 11*b* is provided with a pair of connecting terminals 11*d*, 11*d* for electrical connection to the coil 8. The connecting terminals 11*d*, 11*d* are electrically connected to the coil 8 e.g. by soldering between the connecting terminals 11*d*, 11*d* and the coil 8 (FIG. 6). An electric current can thus be applied from the external power source to the coil 8 via the lower leaf spring 11.

As shown in FIG. 8, the outer frame portion 11*a* consists of a pair of spaced-apart outer frame members $\mathbf{11}a_1$, $\mathbf{11}a_2$ so that the connecting terminals 11*e*, 11*e* will not short-circuit. Further, the inner frame portion 11*b* consists of a pair of spaced-apart outer frame members $\mathbf{11}b_1$, $\mathbf{11}b_2$ so that the connecting terminals 11*d*, 11*d* will not short-circuit.

Materials for the upper leaf spring 5 and the lower leaf spring 11 will now be described. Both of the upper leaf spring 5 and the lower leaf spring 11 can be produced by etching or punching of a metal plate made of a copper alloy. Examples of the copper alloy may include beryllium-copper (Cu—Be), nickel-tin-copper (Cu—Ni—Sn) and titanium-copper (Cu—Ti).

(Method for Producing Leaf Spring)

A method for producing the upper leaf spring 5 and the lower leaf spring 11 will now be described with reference to FIGS. 9(*a*) through 9(*g*).

The upper leaf spring 5 and the lower leaf spring 11 are each produced by processing a leaf-spring material 40 comprising a copper alloy (beryllium-copper, nickel-tin-copper, titanium-copper, or the like).

Figure 9:
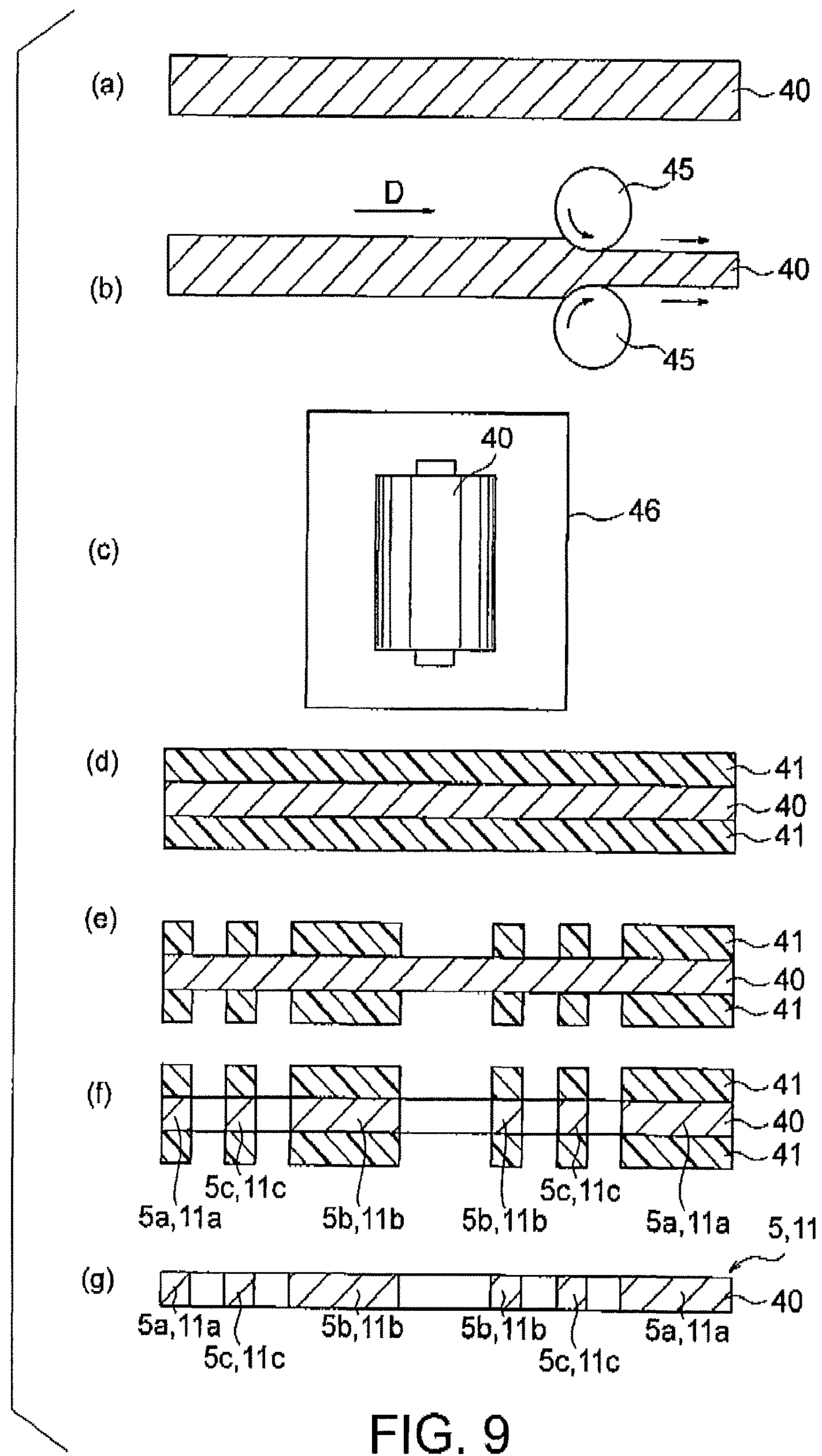
FIGS. 9(*a*) through 9(*g*) are schematic cross-sectional views illustrating a method for producing a leaf spring.
Figure 10:
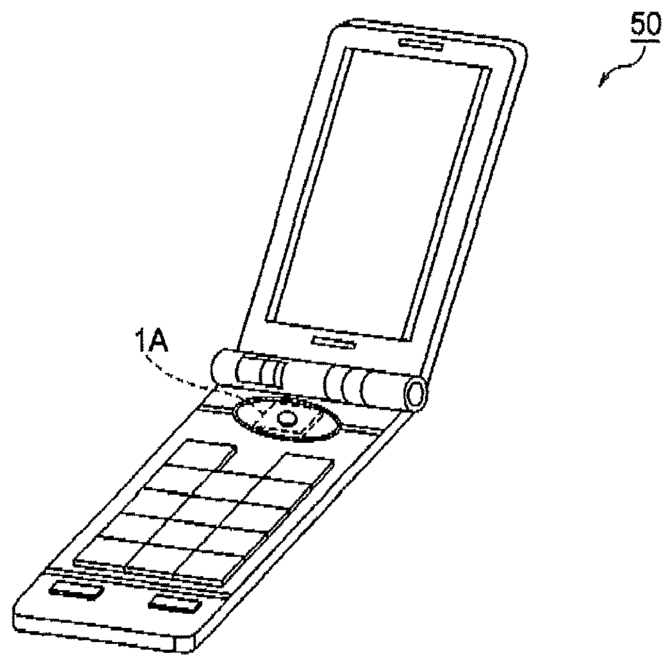
FIG. 10 is a perspective view of an electronic terminal.

In particular, as shown in FIG. 9(*a*), a (unprocessed) leaf-spring material 40 is first prepared.

Next, as shown in FIG. 9(*b*), the leaf-spring material 40 is rolled in a predetermined rolling direction D: the leaf-spring material 40 is passed between a pair of rollers 45, 45 and rolled into a predetermined thickness. The rolling may be performed by hot rolling or cold rolling, or by a combination of hot rolling and cold rolling.

Subsequently, the leaf-spring material 40 is wound into a roll, and is then annealed in a hydrogen atmosphere e.g. in a bell-type batch annealing furnace 46 (FIG. 9(*c*)). The leaf-spring material 40 is heated and gradually cooled for 20 to 28 hours e.g. at a maximum temperature of 250° C. to 350° C. in the annealing furnace 46. In a preferable manner, the leaf-spring material 40 is heated to the maximum temperature for 8 to 14 hours, then kept at the temperature for 1, to 3 hours, and then gradually cooled for 8 to 14 hours. By heating the leaf-spring material 40 under the above conditions, especially by heating the leaf-spring material 40 at the maximum temperature which is not so high as to change the crystal structure and by taking a long time to raise the temperature of the leaf-spring material 40 to the maximum temperature, residual stress can be fully removed without changing the crystal structure.

As described above, the step of annealing the leaf-spring material 40 is preferably carried out in a hydrogen atmosphere. By performing the annealing in a hydrogen atmosphere, hydrogen combines with oxygen to form water. Thus, the copper alloy constituting the leaf-spring material 40 will not be oxidized. In addition, there occurs a reaction to reduce copper oxide present in the surface of the leaf-spring material 40. Therefore, unlike a common annealing process performed in an atmosphere of an inert gas such as nitrogen gas, the hydrogen-atmosphere annealing can enhance the quality of the leaf springs 5, 11.

The leaf-spring material 40 (intermediate material) thus produced has a stress at 0.2% strain (0.2% proof stress) of not less than 1150 MPa and a stress at 0.025% strain (0.025% proof stress) of not less than 1000 MPa. Such a leaf-spring material 40 is also provided according to this embodiment.

The "0.2% proof stress" can be determined in the following manner: A tangent line is drawn to the stress-strain curve at the point of 0% strain. Next, a straight line parallel to the tangent line is drawn from the point of 0.2% strain. The "0.2% proof stress" is the stress at the point of intersection between the straight line and the curve. Similarly, the "0.025% proof stress" can be determined in the following manner: A tangent line is drawn to the stress-strain curve at the point of 0% strain. Next, a straight line parallel to the tangent line is drawn from the point of 0.025% strain. The "0.025% proof stress" is the stress at the point of intersection between the straight line and the curve.

By making the stress at 0.2% strain (0.2% proof stress) of the leaf-spring material 40 not less than 1150 MPa, the problem of deformation of the leaf springs 5, 11 upon few-time application of a large stress (e.g. the impact of fall) can be prevented. On the other hand, by making the stress at 0.025% strain (0.025% proof stress) of the leaf-spring material 40 not less than 1000 MPa, the stress that causes a slight elongation of the leaf-spring material 40 is increased. This can prevent the problem of deformation of the leaf springs 5, 11 upon many-time application of a small stress.

Thus, after incorporating the upper leaf spring 5 and the lower leaf spring 11 into the module, the leaf springs 5, 11 can be prevented from being slightly deformed even when an impact, e.g. due to fall, is applied to them. Therefore, the electric current value necessary to displace the lenses 26 to a desired degree can be made constant. This makes it possible to provide a camera module drive mechanism 1 whose focusing function does not decline over a long period of time.

As described above, residual stress can be removed from the leaf-spring material 40, especially from the outermost surface, by annealing the leaf-spring material 40 after rolling it. The 0.2% proof stress and the 0.025% proof stress of the leaf-spring material 40 can therefore be enhanced. However, the present invention is not limited to this production method: it is also possible to first anneal the leaf-spring material 40, followed by rolling of the annealed material. Such a method can also make the 0.2% proof stress of the leaf-spring material 90 after rolling not less than 1150 MPa, and make the 0.025% proof stress of the leaf-spring material 40 after rolling not less than 1000 MPa.

Next, the leaf-spring material 40 is processed into a predetermined planar shape.

In particular, as shown in FIG. 9(*d*), the leaf-spring material 40 is coated with a resist 41. The resist 41, which may be a dry film resist or a liquid resist, is selected depending on a later step(s).

Next, a glass pattern is placed on the resist 41, and the resist 41 is exposed for a predetermined time by using an ultrahigh pressure mercury lamp. The resist 41 is then developed, followed by post-baking to form a predetermined pattern of the resist 41 on the leaf-spring material 40 (see FIG. 9(*e*)).

Thereafter, the leaf-spring material 40 coated with the resist 41 is subjected to etching using an etching solution, such as an aqueous solution of ferric chloride, to process the leaf-spring material 40 so that it has a predetermined planar shape (see FIG. 9(*f*)). In this manner, the outer frame portions 5*a*, 11*a*, the inner frame portions 5*b*, 11*b* and the spring portions 5*c*, 11*c* are formed in the leaf-spring material 40.

Next, the resist 41 is peeled from the leaf-spring material 40 by using a resist peeling solution such as a sodium hydroxide solution, followed by water washing and drying of the leaf-spring material 40 (see FIG. 9(*g*)).

Thereafter, the leaf-spring material 40 is out into spring-shaped pieces. The upper leaf spring 5 and the lower leaf spring 11 are thus obtained from the leaf-spring material 40 (see FIG. 9(*g*)).

According to this embodiment, the stress at 0.2% strain (0.2% proof stress) of the leaf-spring material 40 is made as high as not less than 1150 MPa, and the stress at 0.025% strain of the leaf-spring material 40 is made as high as not less than 1000 MPa. This makes it possible to prevent the problem of deformation of the leaf springs 5, 11 even when a large stress is applied a few times (e.g. one or two times) to the leaf springs 5, 11 or when a small stress is applied many times (e.g. 100 or more times) to the leaf springs 5, 11. It therefore becomes possible for the focusing function of the camera module drive mechanism 1 not to decline over a long period of time.

In this embodiment the rolled leaf-spring material 40 is annealed, and then it is processed by etching into a predetermined shape. However, the present invention is not limited to this method. Thus, it is also possible to process the rolled leaf-spring material 40 into a predetermined shape by etching, and then anneal the leaf-spring material 40. This method has the advantage that a smaller-sized annealing furnace can be used because the leaf-spring material 40 to be annealed has undergone etching.

(Operation of Camera Module Drive Mechanism)

The operation of the camera module drive mechanism will now be described with reference to FIG. 6.

First, an electric current is applied to the coil 8 via the lower leaf spring 11. An interaction occurs between the electric current and a magnetic field of the magnet pieces 7, and an upward force acts on the holder 9. The upward force opposes the forces of the upper leaf spring 5 and the lower leaf spring 11, and can lift up the lens unit 26A as a whole (see FIG. 6).

By adjusting the amount of the electric current applied to the coil 8, the force that moves the holder 9 upward can be changed so as to balance the force with the forces of the upper leaf spring 5 and the lower leaf spring 11. This enables adjustment of the vertical movement and the position of the holder 9.

In this embodiment the outer frame portions 5*a*, 11*a* of the upper leaf spring 5 and the lower leaf spring 11 are provided with the attachment portions 30A close to the connecting portions connecting the outer frame portions 5*a*, 11*a* to the spring portions 5*c*, 11*c*, while the inner frame portions 5*b*, 11*b* are provided with the attachment portions 30B close to the connecting portions connecting the inner frame portions 5*b*, 11*b* to the spring portions 5*c*, 11*c*.

By thus firmly fixing both ends of the spring portions 5*c*, 11*c* of the upper leaf spring 5 and the lower leaf spring 11 to the yoke 6 which is secured to the base 13 of the chassis 2A, to the base 13 and to the holder 9, the spring constant of the spring portions 5*c*, 11*c* can be stabilized.

Thus, a camera module drive mechanism having stable spring properties can be obtained.

EXAMPLES

Specific examples of this embodiment will now be described.

Example 1

Figure 11:
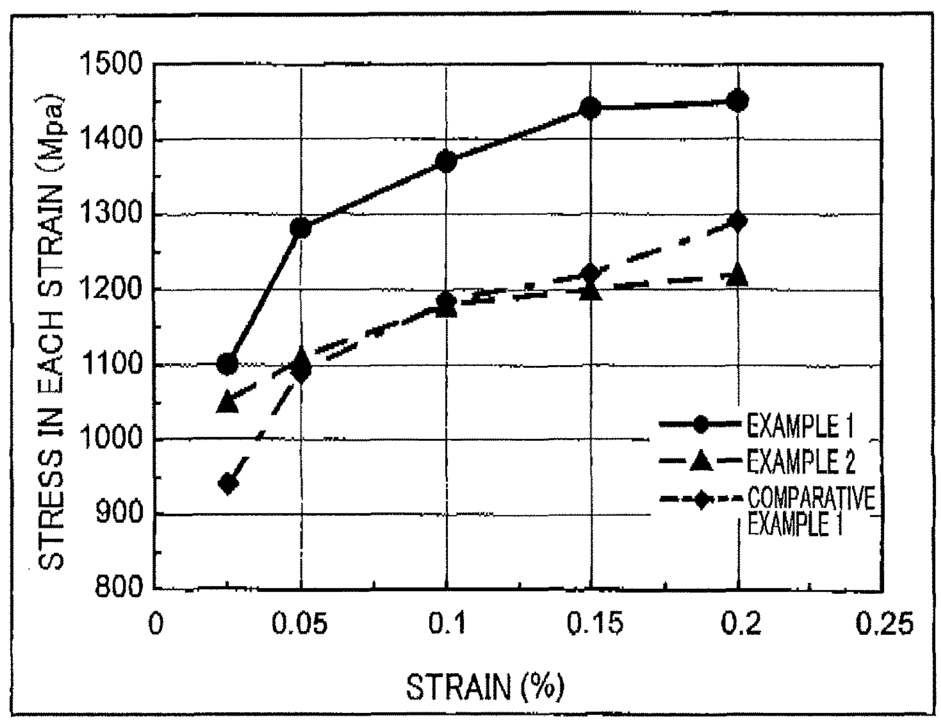
FIG. 11 is a graph showing the 0.025% proof stress, 0.05% proof stress, 0.1% proof stress, 0.15% proof stress and 0.2% proof stress of each of the leaf spring materials of Examples 1, 2 and Comp. Example 1.

An upper leaf spring 5 having the construction shown in FIG. 7 and a lower leaf spring 11 having the construction shown in FIG. 8 (Example 1) were produced in the following manner. A leaf-spring material 40 of titanium-copper (comprising 2.9% titanium and 97.1% copper) was rolled, and the rolled leaf-spring material 40 was then annealed. The annealing was performed by raising the temperature of the leaf-spring material 40 to 300° C. for 9 hours in an annealing furnace 46, keeping the leaf-spring material 40 at the temperature for 3 hours, and then gradually cooling the leaf-spring material 40 for 12 hours. Subsequently, the 0.025% proof stress, 0.05% proof stress, 0.1% proof stress, 0.15% proof stress and 0.2% proof stress of the leaf-spring material 40 were measured (FIG. 11). As a result, the 0.025% proof stress and the 0.2% proof stress were found to be 1100 MPa and 1450 MPa, respectively. The measurement of each of the 0.025% proof stress, the 0.05% proof stress, the 0.1% proof stress, the 0.15% proof stress and the 0.2% proof stress of the leaf-spring material 40 was carried out on a 4 mm-wide test specimen, which had been cut from the leaf-spring material 40, by using a tensile tester. Thereafter, the leaf-spring material 40 was subjected to etching to produce an upper leaf spring 5 and a lower leaf spring 11. The upper leaf spring 5 and the lower leaf spring 11 had a thickness of 30 μm.

Example 2

An upper leaf spring 5 having the construction shown in FIG. 7 and a lower leaf spring 11 having the construction shown in FIG. 8 (Example 2) were produced in the following manner. A leaf-spring material 40 of nickel-tin-copper (comprising 15% nickel, 8% tin and 77% copper) was annealed, and the annealed leaf-spring material 40 was then rolled. Subsequently, the 0.025% proof stress, 0.05% proof stress, 0.1% proof stress, 0.15% proof stress and 0.2% proof stress of the leaf-spring material 40 were measured (FIG. 11). As a result, the 0.025% proof stress and the 0.2% proof stress were found to be 1050 MPa and 1220 MPa, respectively. Thereafter, the leaf-spring material 40 was subjected to etching to produce an upper leaf spring 5 and a lower leaf spring 11. The upper leaf spring 5 and the lower leaf spring 11 had a thickness of 30 μm.

Comparative Example 1

A leaf-spring material having the same shape and made of the same material as Example 1 was produced in the same manner as in Example 1 except that the leaf-spring material was rolled after it was annealed. Subsequently, the 0.025% proof stress, 0.05% proof stress, 0.1% proof stress, 0.15% proof stress and 0.2% proof stress of the leaf-spring material 40 were measured (FIG. 11).

As a result, the 0.025% proof stress and the 0.2% proof stress were found to be 950 MPa and 1280 MPa, respectively. Thereafter, the leaf-spring material 40 was subjected to etching to produce an upper leaf spring and a lower leaf spring. The upper leaf spring and the lower leaf spring had a thickness of 30 μm.

The three types of upper leaf springs and lower leaf springs (Example 1, Example 2 and Comp. Example 1) were each incorporated into a camera module, and the camera modules were subjected to a drop test. The drop test was carried out in accordance with JIS C60068-2-32, Method 1, Free Fall Test Method under the condition "severity (height) 750 mm". Thereafter, of the total number (100) of the camera modules tested, the number of those camera modules in which deformation of the upper leaf spring and the lower leaf spring occurred was measured.

Further, the three types of upper leaf springs and lower leaf springs (Example 1, Example 2 and Comp. Example 1) were each incorporated into a camera module, and the camera modules were subjected to a repeated drop test. The repeated drop test was carried out by dropping each camera module 100 times from a height of 500 mm in accordance with JIS C60068-2-32, Method 2, Repeated Free Fall Test Method. Thereafter, of the total number (100) of the camera modules tested, the number of those camera modules in which deformation of the upper leaf spring and the lower leaf spring occurred was measured.

The results are shown in Table 2.

TABLE 2

| | | | Deformation | |
|---|---|---|---|---|
| | 0.025% proof stress | 0.2% proof stress | Drop test | Repeated drop test |
| Example 1 | 1100 MPa | 1450 MPa | 0/100 | 0/100 |
| Example 2 | 1050 MPa | 1220 MPa | 0/100 | 0/100 |
| Comp. Example 2 | 950 MPa | 1280 MPa | 0/100 | 30/100 |

As a result, no deformation occurred in the upper leaf springs 5 and the lower leaf springs 11 of Examples 1 and 2. While no deformation occurred in the upper leaf springs and the lower leaf springs of Comp. Example 1 in the drop test, deformation occurred in some of them in the repeated drop test.

The above-described first embodiment, second embodiment and third embodiment may be performed in any appropriated combination.

DESCRIPTION OF THE REFERENCE NUMERALS

1 camera module drive mechanism
1A camera module
2 cover
2A chassis
4 regulation plate
5 upper leaf spring
5*a* outer frame portion
5*b* inner frame portion
5*c* spring portion
5*f* inner periphery
5*g* connecting portion
5*h* outer periphery
6 yoke
7 magnet piece
8 coil
9 holder
9A inner holder
95 outer holder
11 lower leaf spring
11*a* outer frame portion
11*b* inner frame portion
11*c* spring portion
11*d* connecting terminal
11*e* connecting terminal
11*f* inner periphery
11*g* connecting portion
11*h* outer periphery
12 flexible printed circuit board
13 base
17 positioning hole
20 pedestal
21 intermediate support
22 UV-protective glass
24 glass plate
25 imaging device
26 lenses
26A lens unit
30A, 30B attachment portion

The invention claimed is:

1. A leaf spring for use in a camera module drive mechanism, comprising:
an outer frame portion;
an inner frame portion disposed inside the outer frame portion; and
a spring portion connected between the inner frame portion and the outer frame portion, wherein the spring portion has a cross-sectional shape in a cross section perpendicular to an extending direction of the spring portion, wherein the cross-sectional shape has an upper side facing upwardly and a lower side facing downwardly which are of the same length and parallel to each other, and the other two sides being curved inward.

2. The leaf spring according to claim 1, wherein the leaf spring is produced by using a copper alloy leaf-spring material, and the leaf-spring material has a stress at 0.2% strain of not less than 1150 MPa and a stress at 0.025% strain of not less than 1000 MPa.

3. A camera module drive mechanism comprising:
a chassis;
a lens unit that constitutes an optical system;
a holder disposed in the chassis and housing the lens unit and which is movable in the direction of the optical axis of the lens unit;
a coil provided on the holder;
a yoke and a magnet piece, which are provided on the chassis and which provide a magnetic field to the coil; and
the leaf spring according to claim 1 interposed between the chassis and the holder.

4. A leaf spring for use in a camera module drive mechanism, comprising:
an outer frame portion;
an inner frame portion disposed inside the outer frame portion; and
a spring portion connected between the inner frame portion and the outer frame portion, wherein the spring portion has a cross-sectional shape in a cross section perpendicular to an extending direction of the spring portion, wherein the cross-sectional shape has an upper side facing upwardly and a lower side facing downwardly which are of different lengths and parallel to each other, and the other two sides being curved inward.

5. A camera module drive mechanism comprising:

a chassis;

a lens unit that constitutes an optical system;

a holder disposed in the chassis and housing the lens unit and which is movable in the direction of the optical axis of the lens unit;

a coil provided on the holder;

a yoke and a magnet piece, which are provided on the chassis and which provide a magnetic field to the coil; and the leaf spring according to claim 4 interposed between the chassis and the holder.

6. The leaf spring according to claim 4, wherein the leaf spring is produced by using a copper alloy leaf-spring material, and the leaf-spring material has a stress at 0.2% strain of not less than 1150 MPa and a stress at 0.025% strain of not less than 1000 MPa.

7. A leaf spring for use in a camera module drive mechanism and which is produced by using a copper alloy leaf-spring material, comprising:

an outer frame portion;

an inner frame portion disposed inside the outer frame portion; and a spring portion connected between the inner frame portion and the outer frame portion, wherein the spring portion has a cross-sectional shape in a cross section perpendicular to an extending direction of the spring portion, wherein the cross-sectional shape has an upper side facing upwardly and a lower side facing downwardly which are of the same length or different lengths and parallel to each other, and the other two sides being curved inward, and wherein the leaf-spring material has an electrical conductivity of not less than 8% IACS and a 0.2% proof stress of not less than 900 MPa.

8. The leaf spring according to claim 7, wherein the leaf-spring material has a Vickers hardness of not less than 290 HV.

9. The leaf spring according to claim 7, wherein the leaf-spring material does not contain beryllium as a component thereof.

10. The leaf spring according to claim 7, wherein the upper side and the lower side are of the same length.

11. The leaf spring according to claim 7, wherein the upper side and the lower side are of different lengths.

12. A camera module drive mechanism comprising:

a chassis;

a lens unit that constitutes an optical system;

a holder disposed in the chassis and housing the lens unit and which is movable in the direction of the optical axis of the lens unit;

a coil provided on the holder;

a yoke and a magnet piece, which are provided on the chassis and which provide a magnetic field to the coil; and the leaf spring according to claim 7 interposed between the chassis and the holder.

13. The camera module drive mechanism according to claim 12, wherein the leaf-spring material has a Vickers hardness of not less than 290 HV.

14. The camera module drive mechanism according to claim 12, wherein the leaf-spring material does not contain beryllium as a component thereof.

15. The camera module drive mechanism according to claim 12, wherein the upper side and the lower side are of the same length.

16. The camera module drive mechanism according to claim 12, wherein the upper side and the lower side are of different lengths.

17. The leaf spring according to claim 7, wherein the leaf-spring material comprises titanium-copper.

* * * * *